United States Patent
Raynal et al.

(10) Patent No.: US 7,122,162 B2
(45) Date of Patent: Oct. 17, 2006

(54) REACTION CHAMBER THAT IS ELONGATED ALONG AN AXIS THAT CONTAINS AT LEAST ONE SOLID CATALYST BED AND AT LEAST ONE BOX FOR CONTACT, MIXING AND QUENCHING

(75) Inventors: Ludovic Raynal, Oullins (FR); Isabelle Harter, Lyons (FR); Francis Aubry, Saint Genis Laval (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 397 days.

(21) Appl. No.: 10/141,353

(22) Filed: May 9, 2002

(65) Prior Publication Data
US 2002/0187086 A1 Dec. 12, 2002

(30) Foreign Application Priority Data
May 9, 2001 (FR) .................................. 01 06213

(51) Int. Cl.
*B01F 3/00* (2006.01)
*B01F 3/04* (2006.01)
*B01J 19/00* (2006.01)
*B01J 19/24* (2006.01)

(52) U.S. Cl. ...................... 422/228; 422/224; 422/225; 261/18.1; 261/19; 261/75

(58) Field of Classification Search ................ 422/224, 422/225, 228; 261/1, 18.1, 19, 75, 100
See application file for complete search history.

(56) References Cited

U.S. PATENT DOCUMENTS 5,935,413 A * 8/1999 Boyd et al. .................... 208/49
5,989,502 A * 11/1999 Nelson et al. ............... 422/194

* cited by examiner

Primary Examiner—Alexa D. Neckel
(74) Attorney, Agent, or Firm—Millen, White, Zelano & Branigan, P.C.

(57) ABSTRACT

A reaction chamber (4) elongated along an essentially vertical axis in which at least one reaction fluid is circulated from top to bottom of said chamber (4) through at least one catalyst bed (5), whereby downstream from catalyst bed (5) in the direction of circulation of the reaction fluid, the chamber contains at least one inlet (1) for introducing at least one quenching fluid into contact with the reaction fluid, and downstream from inlet (1) the chamber contains at least one box (8) for further contact, mixing and quenching of said fluids. The box (8) has at least one passage section (9) for entry of the fluids into the box (8). Downstream from the passage section (9) the box (8) contains elements (11) that puts fluids into vortex motion in the box (8) in a direction essentially non-radial and non-parallel to the axis of the chamber.

22 Claims, 4 Drawing Sheets

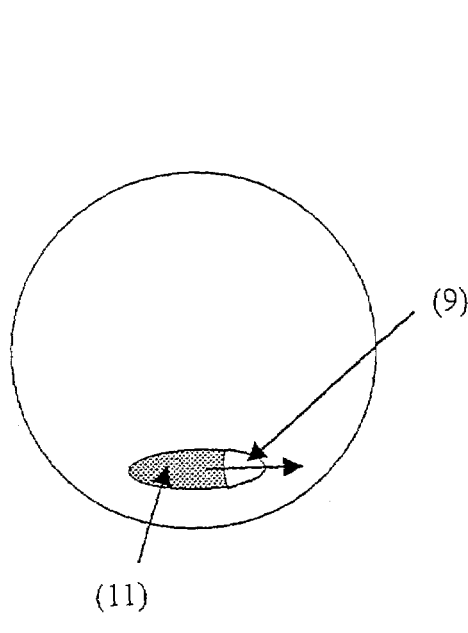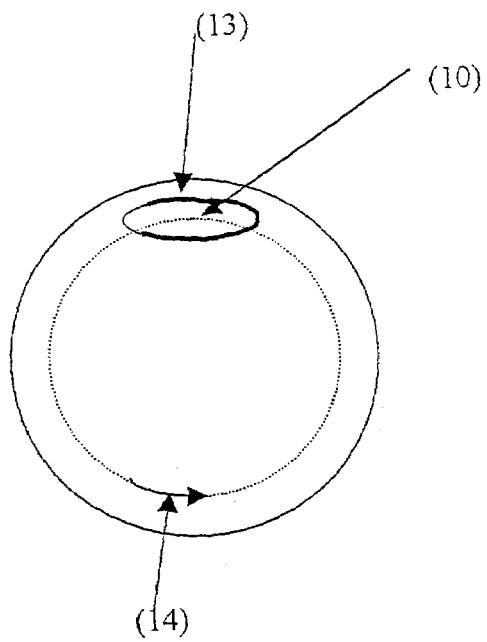
Figure 4a
Figure 4b
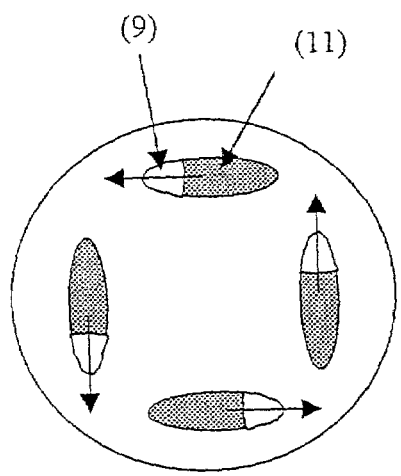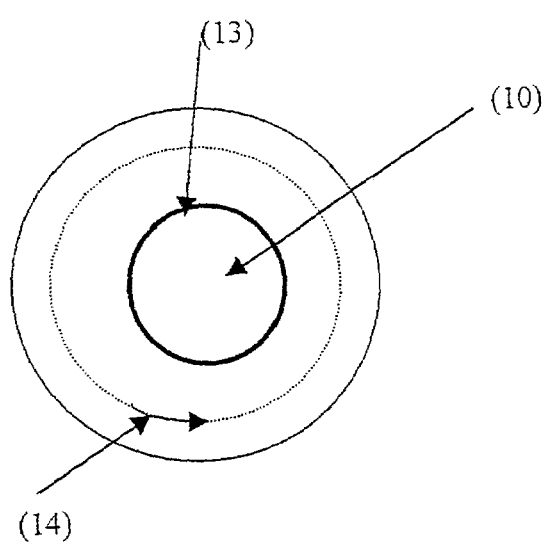
Figure 5a
Figure 5b

REACTION CHAMBER THAT IS ELONGATED ALONG AN AXIS THAT CONTAINS AT LEAST ONE SOLID CATALYST BED AND AT LEAST ONE BOX FOR CONTACT, MIXING AND QUENCHING

In the specific field of reactions for hydrotreatment, hydrodesulfurization, hydrodenitrating, hydrocracking, hydrodearomatization and for selective or total or partial hydrogenations, i.e., in the fields where the reactions are exothermic and require their cooling by an additional fluid that is usually gaseous but optionally liquid or sometimes mixed, containing liquid and gas, it is necessary to have a very good quenching system to carry out, on the one hand, the cooling of the fluids of the process to the desired temperature and, on the other hand, to achieve substantial temperature uniformity (homogenization) of the resultant quenched fluid (mixing function). The process fluid or fluids can be liquid, gaseous, or mixed.

To carry out this quenching and this homogenization, it is often necessary for one skilled in the art to use a specific arrangement of often complex internals comprising the most homogeneous possible introduction of quenching fluid into the section of the reactor. This can be done either by multi-hole systems such as those described in, for example, the documents of patents U.S. Pat. No. 3,353,924, EP 716,881, U.S. Pat. No. 5,025,831 or by basket-type systems such as those described in, for example, the documents of patents U.S. Pat. No. 4,836,989, FR 2,253,554 or else directly in a mixing chamber by several tubes such as the one that is described in particular in the document of Patent WO 9746303, followed by one or more mixing boxes that are intended to homogenize the process fluids and the quenching fluid or fluids. These boxes are generally very complex. They are often double, and even triple, such as the ones that are described in the documents of patents U.S. Pat. No. 5,232,283, U.S. Pat. No. 5,462,719, U.S. Pat. No. 5,567,396 that are often equipped with internals such as blades, flanges, baffles or deflectors as described, for example, in patents U.S. Pat. No. 5,462,719, U.S. Pat. No. 5,567,396, and WO 9746303. The major drawbacks of this type of system, in addition to the quality of the mixture that is often of moderate quality, are the space requirement (space taken up in the reactor), the complexity of implementation and operation and the induced loss of load.

In many systems that are described in the prior art, the inlets and outlets are generally very numerous as is evident in particular from the descriptions of the documents of patents U.S. Pat. No. 5,462,719 and U.S. Pat. No. 5,567,396. It is then not very likely that any local heterogeneity that preexists at the inlet of the system can decrease at the outlet of the system that does not seem to allow adequate mixing with all the fluid that circulates in the system.

This invention has the object in particular of ensuring an effective exchange between the quenching fluid or fluids and the process fluid or fluids. It also has as its object to remedy the primary drawbacks of the various systems of the prior art such as the one that is known by the applicant and cited above in this description, and in particular:

To make up all the inhomogeneity effects of temperature of the process fluid or fluids, To reduce the loss of load ($\Delta P$) that is induced by the box for contact, mixing and quenching of this invention, To remedy the drawbacks that are linked to the complexity and to the space requirement of the solutions that are proposed in the prior art.

This invention comprises a reaction chamber that contains at least one box that ensures at least a portion of the quenching, the bringing into contact and the mixing of at least one quenching fluid, whereby this fluid can be liquid or gaseous or mixed, containing liquid and gas, with at least one process fluid and often with at least one gaseous phase that comprises at least in part hydrogen and at least one liquid phase for a chamber or reactor that contains at least one granular catalytic solid bed, whereby said phases are in a globally descending flow into said chamber and pass through said granular solid bed.

Figure 1:
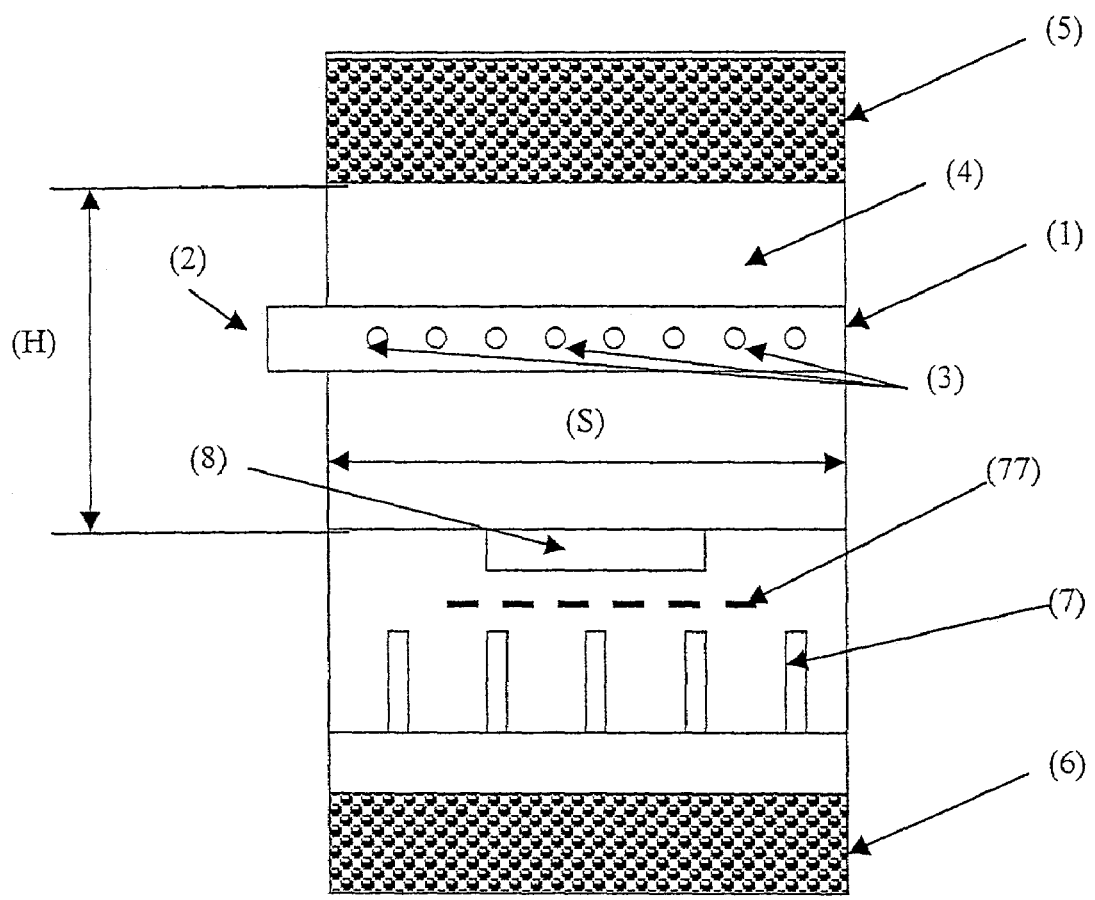
FIG. 1 diagrammatically represents a chamber or reactor according to the invention but should not be considered as limiting, and the same holds true for FIGS. 2, 3, 4a, 4b, 5a, 5b and 6, which are only special diagrammatic examples that illustrate this invention. In these diagrammatic figures, similar elements are designated by the same reference numbers and letters.

In its broader form, this invention relates to a reaction chamber (4) that is elongated along an essentially vertical axis in which at least one reaction fluid is circulated from top to bottom of said chamber (4) through at least one catalyst bed (5), whereby downstream from catalyst bed (5) in the direction of circulation of said reaction fluid, said chamber comprises at least one means (1) for introducing at least one quenching fluid, and downstream from said means (1) for introducing the quenching fluid, said chamber comprises at least one box (8) for contact, mixing and quenching of said fluids, with primary dimension (D) and height (H1), comprising at least one passage section (9) for entry of said fluids into said box (8), in which downstream from said passage section (9) in the direction of circulation of said reaction fluid, said box (8) comprises a means (11) that puts fluids into vortex motion in said box (8) in a direction that is essentially non-radial and non-parallel to the axis of said chamber, and comprising, downstream from said means (11) in the direction of said circulation of said reaction fluid, at least one passage section (10) for output of said fluid mixture that is formed in said box (8). In box (8) under the effect of means (11), the fluids will acquire a so-called rotational or vortex motion that is usually in a plane that is not parallel to a plane that passes through the axis of the chamber and often in a plane that is essentially perpendicular to the axis of the chamber. The fluid mixture that exits from box (8) then usually circulates in a direction that is essentially parallel to the axis of the chamber.

This chamber comprises at least one tube (1) (see FIG. 1) for introducing quenching fluid, whereby this tube has at least one passage section (2) (see FIG. 1) of any shape but preferably oblong or essentially circular for entry of the major portion of the quenching fluid and at least one passage section (3) (see FIG. 1) of any shape for the output of the major portion of the quenching fluid. The quenching fluid is injected in said chamber (4) (see FIG. 1) essentially below a granular solid bed (5) (see FIG. 1) and in the non-limiting case of this invention that is shown in a diagram in Figure (1) essentially above a granular solid bed (6) (see FIG. 1). This chamber as shown in a diagram in FIG. 1 comprises a distribution plate (7) of various phases that circulate in the chamber. The scope of this invention would not be exceeded by including in chamber (4) several distribution plates and/or several systems for introducing a quenching fluid. Box (8) of any shape that forms an integral part of this invention can occupy from 2 to 100% of section (S) of the chamber; it often occupies from 5 to 98% of this section and most often 5 to 25% of this section.

Figure 2:
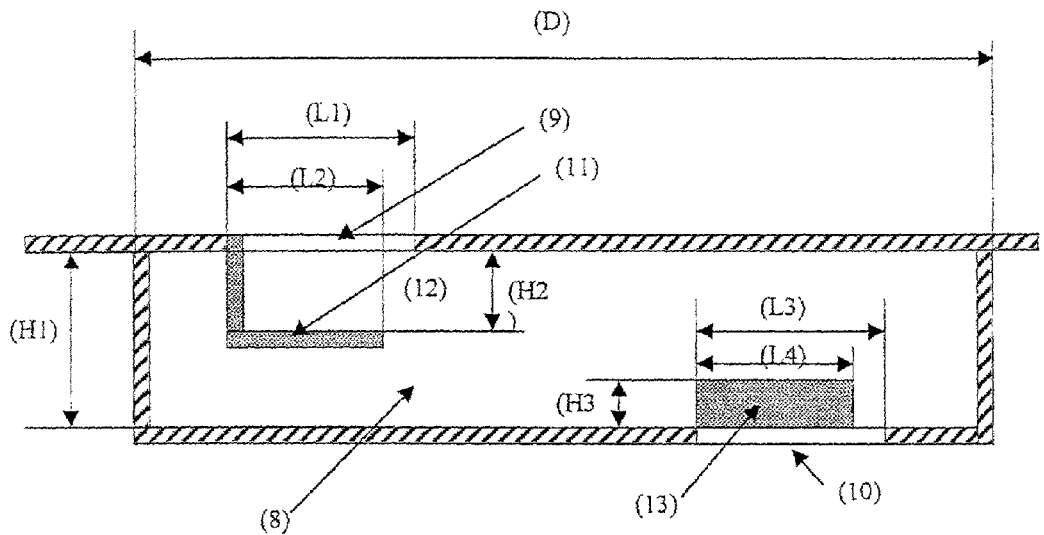

Box (8) shown in a diagram in FIG. 1 and in a more detailed way in FIG. 2 comprises in its upper portion at least one passage section (9) (see FIG. 2) of any shape for the introduction of the process fluid or fluids that can be either gaseous or liquid or liquid and gaseous and for the introduction of the quenching fluid or fluids in box (8) and at least one passage section (10) (see FIG. 2) of any shape in its lower portion for the output of the mixture of process fluids and quenching fluids. Most often, passage sections (9) and (10) (see FIG. 2) are not directly above one another, although this is not ruled out within the scope of operation of this invention. Height (H1) (see FIG. 2) of box (8) often varies from about 5 to about 1000 millimeters (mm), preferably from about 30 to about 300 mm.

Means (11) that is located downstream from each passage section (9) (see FIG. 2) is most often a deflector (11) of any shape whose envelope (exterior geometry, outer surface or jacket) essentially corresponds to the envelope of passage section (9) and whose length (L2) is usually between at least about 1% (often at least about 5%, and most often at least about 10%) of length (L1) of the inlet of passage section (9) and 100% (often at least about 90%, very often at least about 80%, and most often at least about 50%) of primary dimension (D) (see FIG. 2) of box (8). Length L1 of section (9) is itself usually between 1% and 100% inclusive of primary dimension (D); this ratio is based on the number of passage sections (9). In particular when there are four passage sections (9), L1 is usually between 1% and 78% inclusive, preferably between 5% and 60% inclusive of primary dimension (D). Height (H2) of deflector (11) is usually between 1 and 95% (inclusive), often between 10 and 90% of height (H1) of box (8). This internal comprises (see FIG. 2) an essentially horizontal passage section (9) for entry of fluids into its upper portion and an essentially vertical passage section (12) for the output of fluids. Passage section (10) for output of the fluid mixture from box (8) has length L3. Length L3 is usually between 1% and 100% of primary dimension (D); this ratio is based on passage section number (10), in particular when there is a single passage section (10); L3 is between 1% and 100%, preferably between 10% and 90% of primary dimension (D). In a particular and sometimes preferred embodiment, it can be equipped with an outlet deflector (13) of length L4 at its periphery; this length (L4) is usually between (inclusive) about 1% (often about 5% and most often about 10%) of length (L3) of the inlet of passage section (10) and about 100% (often 90%, very often 80%, and most often 50%) of primary dimension (D) (see FIG. 2) of box (8).

According to a particular embodiment upstream from each passage section (10) in the direction of circulation of said reaction fluid, the reaction chamber comprises a deflector (13) of any shape whose envelope (exterior geometry, outer shape or jacket) essentially corresponds to the envelope of passage section (10). Height (H3) of deflector (13) is usually between (inclusive) 1 and 95% and often between 5 and 95% and very often between 5 and 50% of height (H1) of mixing box (8). Deflector (13) usually covers (inclusive) between 1 and 100%, and often between 5 and 100%, and most often between 20 and 100% of the periphery of passage section (10).

The reaction chamber often comprises, downstream from box (8) in the direction of circulation of the reaction fluid, at least one distributor plate (7), and, downstream from the latter in the direction of circulation of the reaction fluid, at least a second catalyst bed (6).

According to another embodiment, the reaction chamber can comprise, downstream from box (8) in the direction of circulation of the reaction fluid, at least one perforated-plate diffuser (77), downstream from the latter in the direction of circulation of the reaction fluid, at least one distributor plate (7), and downstream from the latter in the direction of circulation of the reaction fluid, at least a second catalyst bed (6).

Chamber (4) is most often a circular-section chamber that comprises a box (8) whose surface area can be equal to the surface area of the section of the chamber. The surface area of box (8), however, is often smaller than the surface area of the section of the chamber and in any case, the total surface area of passage sections (9) is less than the surface area of the section of the chamber, and likewise the total surface area of passage sections (10) is less than the surface area of the section of the chamber.

Relative to the devices that are described in the prior art, the device that comprises box (8) of this invention offers the following advantages:

Mixing efficiency that is increased by the sequence of the following elementary operations: spillway effect at the box inlet, impact on internal (11), spillway inside the mixing box combined with a vortex effect induced by the direction change (vertical motion to horizontal motion) [this horizontal motion is shown in a diagram in FIGS. 4b and 5b by the line and the arrow (14)]. In addition, in the case where box (8) is equipped with a deflector (13), an impact effect against deflector (13) and then a spillway effect at the outlet of box (8) are added, whereby these various stages contribute to a significant increase of the contact surface area and the dwell time, A simple operation, A compact unit, A small induced loss of load due to the small number of internals that are installed.

Other advantages and characteristics of the invention will become clearer by reading the description provided below by way of embodiments.

Figure 6:
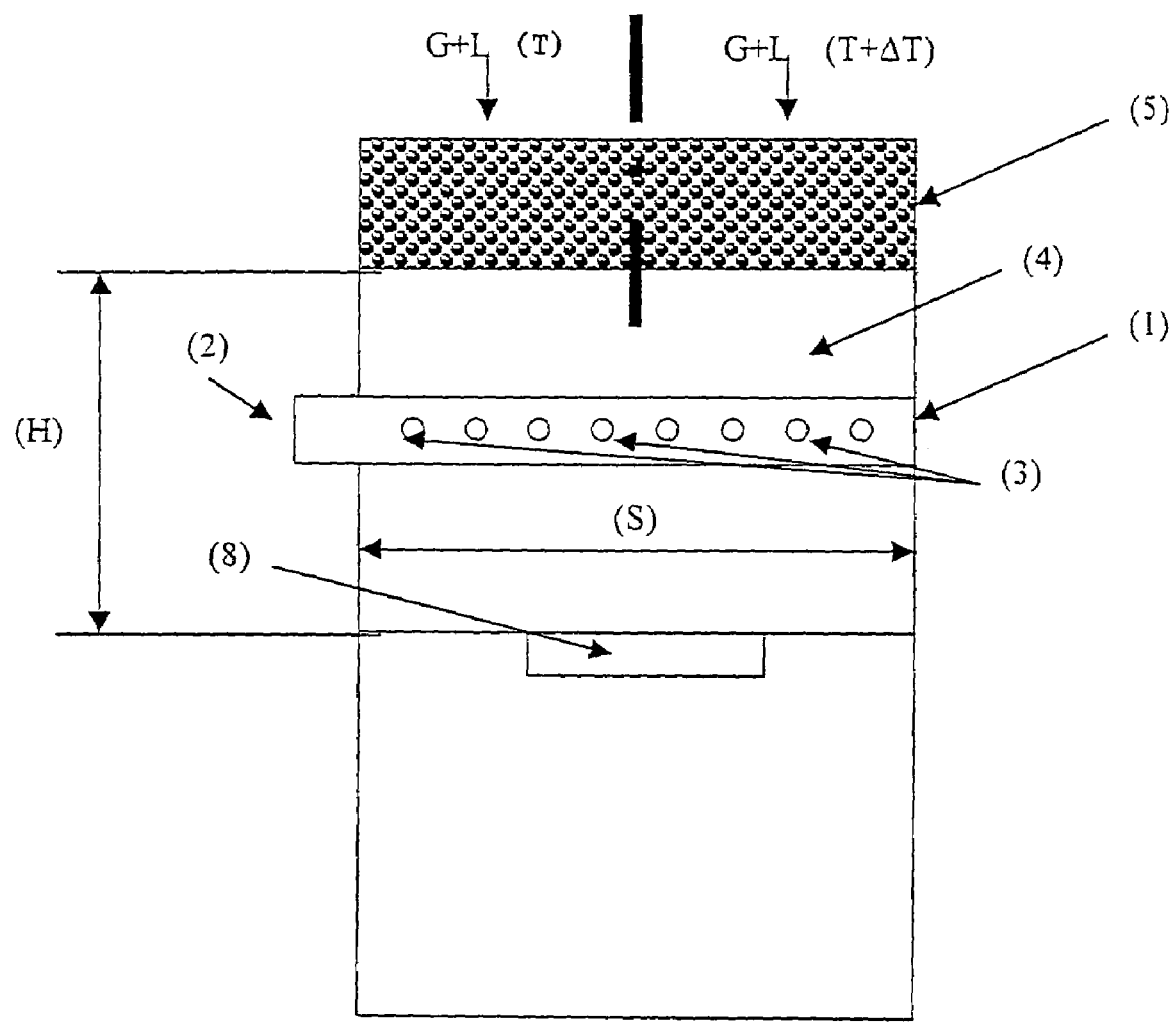

FIG. 1 shows diagrammatically a reactor that comprises two granular solid beds (5) and (6) between which are found a quenching tube (1), provided with an inlet section (2), and passage sections (3) for at least one quenching fluid, a box (8), a perforated-plate diffuser (77) and a distributor plate (7). Box (8) is at a distance (H) below catalytic bed (5) (see FIGS. 1 and 6). The scope of this invention would not be exceeded by using a chamber that does not comprise a diffuser (in particular a perforated-plate diffuser).

Figure 3:
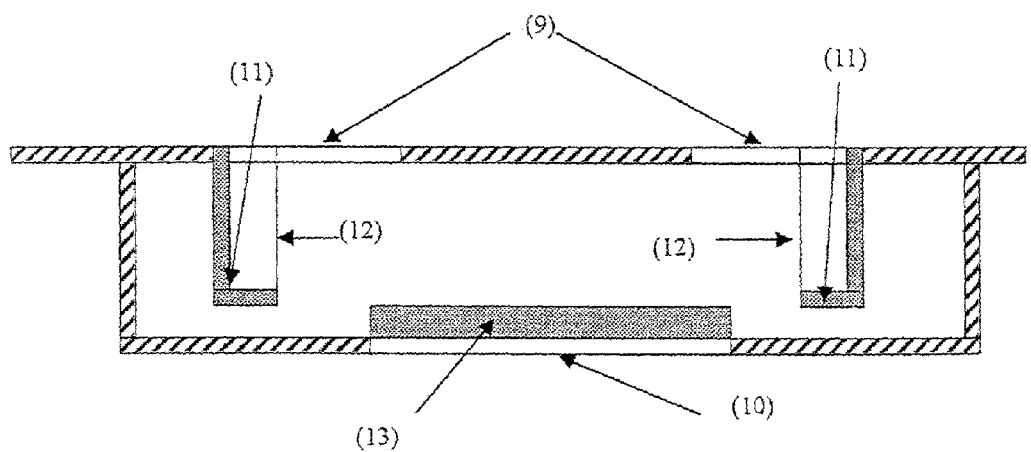

FIGS. 2 and 3 diagrammatically show in section geometry examples that can be produced for box (8) equipped with one or more inlet sections (9), internals (11) of one or more outlet sections (10) and deflectors (13). FIGS. 4a and 5a provide top views of particular boxes (8) that correspond respectively to boxes (8) that are shown in diagrams in FIGS. 2 and 3; FIGS. 4b and 5b provide bottom views of particular boxes (8) that correspond respectively to boxes (8) that are shown in diagrams in FIGS. 2 and 3.

By way of nonlimiting example, measures of efficiency of such a device have been carried out according to the principle that is described below. A model with a diameter of 480 mm is cut into two sectors in its upper portion (see FIG. 6). The two sectors are similarly supplied with gas (G) and liquid (L), whereby one sector is heated (fluids at temperature T$\Delta$T), the other not heated (fluids at temperature T).$\Delta$Thermal imbalance □$\Delta$T is mentioned below. Downstream from this portion that represents catalytic bed (5), the installation comprises a mixing chamber with height (H), inside of which is placed a tube (1) for injecting quenching gas (so-called quenching tube), followed by a box (8) for contact, mixing and quenching. Temperature measurements are taken at the outlet of granular solid bed (5) and at the outlet of box (8). The measurements were taken for an empty-drum liquid surface velocity (Vsl) of 1 cm/s and for an empty-drum gas surface velocity (Vsg) of 10 cm/s and for an empty-drum surface velocity for introducing quenching gas (Vsgq) of 0.5 cm/s. Cases 1 and 2 (Table 1) were carried out with a chamber height (H) of 1000 mm and 500 mm respectively and with a box (8) without an inlet deflector (11) and without an outlet deflector (13) and a thermal imbalance between sectors of 34° C. Case 3 was carried out for exactly the same conditions as case 2 but with the installation of deflectors (11) and (13). Case 4 was carried out for a reduced space requirement, chamber height of 250 mm, and for a thermal imbalance between sectors of 39° C. All of these cases were carried out with a box (8) of identical geometry (same number of inlet and outlet orifices, same dimensions D, L1, L3, H1, only the presence or absence of deflectors varies) and in a chamber of identical geometry for the other elements in all the cases. In cases 3 and 4, dimensions L2, L4, H2 and H3 have been kept constant.

| Case | H (mm) | Deflectors | $\Delta T$ (° C.) Bed Outlet | $\Delta T$ (° C.) Internal Outlet |
|---|---|---|---|---|
| 1 | 1000 | No | 34 | 7.5 |
| 2 | 500 | No | 34 | 14.3 |
| 3 | 500 | Yes | 34 | 1.2 |
| 4 | 250 | Yes | 39 | 1.6 |

It is noted that:

1: Without the deflectors, the reduction of the chamber height is detrimental to the effectiveness of the quenching unit; the fluctuations of temperature at the outlet of the box for contact, mixing and quenching increase when height H decreases (comparison cases 1 and 2), 2: With the addition of deflectors, but all things being equal, furthermore, a very great reduction of temperature fluctuations at box outlet (8) is observed (comparison cases 2 and 3).

3: The good effectiveness of a system according to this invention is only very slightly affected by a reduction of its space requirement (reduction of H) by keeping a box (8) of height (H1) constant and by toughening the operating conditions (increase of temperature fluctuations from case 3 to case 4).

The preceding examples can be repeated with similar success by substituting the generically or specifically described reactants and/or operating conditions of this invention for those used in the preceding examples.

The entire disclosures of all applications, patents and publications, cited above or below, and of corresponding French application No. 01/06.213, filed May 9, 2001 is hereby incorporated by reference.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A reaction chamber (4) elongated along an essentially vertical axis for circulating at least one reaction fluid comprising a liquid phase from top to bottom comprising at least one catalyst bed (5), disposed in said chamber below said catalyst bed (5), at least one means (1) for introducing at least one gaseous quenching fluid into contact with said at least one reaction fluid in said reaction chamber, and below said means (1) for introducing said at least one gaseous quenching fluid, at least one box (8) for further contact, mixing and quenching of said at least one reaction fluid and said at least one gaseous quenching fluid, having a primary dimension (D) and a height (H1), said at least one box comprising at least one passage section (9) for common entry of said previously contacted fluids into said box (8), and below said passage section (9), said box (8) comprises vortex means (11) for providing vortex motion of fluids in said box (8) in a direction essentially non-radial and non-parallel to the axis of said chamber, and comprising, below said vortex means (11), at least one passage section (10) for output of fluid mixture formed in said box (8).

2. Reaction chamber according to claim 1, wherein length L1 of passage section (9) is between 1% and 100% of primary dimension (D) of box (8).

3. A reaction chamber according to claim 1, wherein vortex means (11) located below each passage section (9) comprises a deflector having an exterior shape essentially corresponding to the exterior shape of passage section (9) and whose length (L2) is between (inclusive) about 50% of length (L1) of the inlet of passage section (9) and about 100% of primary dimension (D) of mixing box (8).

4. Reaction chamber according to claim 3, wherein height (H2) of deflector (11) is between (inclusive) 10% and 90% of height (H1) of box (8).

5. A reaction chamber according to claim 3, comprising below box (8) at least one perforated-plate diffuser (77); and below said diffuser (77) at least one distributor plate (7); and below said plate (7) at least a second catalyst bed (6).

6. A reaction chamber according to claim 3, comprising below box (8) at least one distributor plate (7), and below said plate (7) at least a second catalyst bed (6).

7. A reaction chamber according to claim 6, wherein passage sections (9) and (10) are not directly above one another.

8. A reaction chamber according to claim 1, wherein length (L3) of passage section (10) is between 10% and 90% of primary dimension (D) of box (8).

9. A reaction chamber according to claim 1, comprising above each passage section (10) a deflector (13) whose exterior shape essentially corresponds to the exterior shape of passage section (10) and whose length (L4) is between (inclusive) about 10% of length (L3) of passage section (10) and about 50% of primary dimension (D) of box (8).

10. Reaction chamber according to claim 9, wherein height (H3) of deflection (13) is between (inclusive) 1 and 95% of height (H1) of box 8.

11. A reaction chamber according to claim 9, comprising below box (8) at least one perforated-plate diffuser (77); and below said diffuser (77) at least one distributor plate (7); and below said plate (7) at least a second catalyst bed (6).

12. A reaction chamber according to claim 9, comprising below box (8) at least one distributor plate (7), and below said plate (7) at least a second catalyst bed (6).

13. A reaction chamber according to claim 12, wherein passage sections (9) and (10) are not directly above one another.

14. A reaction chamber according to claim 1, wherein passage sections (9) and (10) are not directly above one another.

15. A reaction chamber according to claim 1, wherein box (8) occupies 5 to 25% of section (S) of the chamber.

16. A reaction chamber according to claim 1, comprising below box (8) at least one distributor plate (7), and below said plate (7) at least a second catalyst bed (6).

17. A reaction chamber according to claim 1, comprising below box (8) at least one perforated-plate diffuser (77); and below said diffuser (77) at least one distributor plate (7); and below said plate (7) at least a second catalyst bed (6).

18. A reaction chamber according to claim 1, containing at least one gaseous reaction fluid that contains hydrogen and at least one liquid reaction fluid circulating through at least one catalyst bed, and downstream from said catalyst bed, at least one quenching fluid.

19. A reaction chamber according to claim 1, said at least one box being devoid of inlets for the entry of fluids other than the at least one passage section for the common entry of said previously contacted fluids.

20. A reaction chamber according to claim 19, said reaction chamber being devoid of boxes other than said at least one box (8) for further contact, mixing and quenching of said at least one reaction fluid and said quenching fluid.

21. A reaction chamber according to claim 1, said reaction chamber being devoid of boxes other than said at least one box (8) for further contact, mixing and quenching of said at least one reaction fluid and said quenching fluid.

22. A reaction chamber (4) elongated along an essentially vertical axis for circulation of at least one gas/liquid reaction fluid from top to bottom comprising at least one catalyst bed (5), disposed in said chamber below said catalyst bed (5), at least one means (1) for introducing at least one quenching fluid with the gas/liquid reaction fluid issued from said catalyst bed (5) into contact with said at least one reaction fluid in said reaction chamber, and below said means (1) for introducing quenching fluid, at least one box (8) for further contact, mixing and quenching of reaction and quenching fluids, having a primary dimension (D) and a height (H1), said at least one box comprising at least one passage section (9) for common entry of the mixture resulting from previously contacted said quenching fluid and gas/liquid reaction fluid into said box (8), and below said passage section (9), said box (8) comprises vortex means (11) for providing vortex motion of fluids in said box (8) in a direction essentially non-radial and non-parallel to the axis of said chamber, and comprising, below said vortex means (11), at least one passage section (10) for output of fluid mixture formed in said box (8).

* * * * *